US009493068B2

(12) United States Patent
Li et al.

(10) Patent No.: US 9,493,068 B2
(45) Date of Patent: Nov. 15, 2016

(54) FUEL TANK BAFFLE

(71) Applicant: GM GLOBAL TECHNOLOGY OPERATIONS LLC, Detroit, MI (US)

(72) Inventors: Fan Li, Troy, MI (US); Stephen D. Sibal, Troy, MI (US); Gordon R. McAllister, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/546,459

(22) Filed: Nov. 18, 2014

(65) Prior Publication Data
US 2016/0137058 A1 May 19, 2016

(51) Int. Cl.
*B60K 15/077* (2006.01)
(52) U.S. Cl.
CPC ..... *B60K 15/077* (2013.01); *B60K 2015/0777* (2013.01)
(58) Field of Classification Search
CPC .................................................. B60K 15/077
USPC ................................................. 220/563, 562
See application file for complete search history.

(56) References Cited

U.S. PATENT DOCUMENTS

| 1,616,008 | A | * | 2/1927 | Stout | B64D 37/02 |
| | | | | | 220/563 |
| 3,491,892 | A | * | 1/1970 | McCann | B01D 21/02 |
| | | | | | 210/521 |
| 3,979,005 | A | * | 9/1976 | Robinson | B64D 37/06 |
| | | | | | 206/521 |
| 4,251,005 | A | * | 2/1981 | Sons | B65D 88/06 |
| | | | | | 105/360 |
| 5,308,573 | A | * | 5/1994 | Hirakawa | B29C 49/20 |
| | | | | | 264/516 |
| 5,960,981 | A | * | 10/1999 | Dodson | B65D 90/52 |
| | | | | | 220/507 |
| 2006/0237466 | A1 | * | 10/2006 | Nakanii | B60K 15/077 |
| | | | | | 220/734 |
| 2015/0069070 | A1 | * | 3/2015 | Iwaya | B60K 15/077 |
| | | | | | 220/563 |

FOREIGN PATENT DOCUMENTS

WO    WO 2013153929 A1 * 10/2013 ........... B60K 15/077

OTHER PUBLICATIONS

Translation of WO 2013/153929 (Kunii et al.), Oct. 17, 2013, Paragraphs 9, 21, and 24, translated on Feb. 1, 2016.*

* cited by examiner

*Primary Examiner* — Robert J Hicks
(74) *Attorney, Agent, or Firm* — Cantor Colburn LLP

(57) ABSTRACT

A fuel tank assembly comprises a fuel reservoir and a fuel flow control baffle positioned within the fuel reservoir to reduce the fluid energy/momentum of moving fuel. The fuel flow control baffle further comprises a sheet assembly including a first sheet layer and a second sheet layer, perforations defining attenuation channels, extending through said first and second sheet layers through which moving fuel flows into the fuel flow control baffle and a web positioned between the sheet layers to maintain the layers in a separated, three-dimensional relationship, wherein the web operates to absorb the fluid energy/momentum of the moving fuel and to reverse the fuel flow back through the flow attenuation channels. The fuel control baffle can be easily varied in length to permit usage in multiple locations inside the same tank, and in other different tank designs.

20 Claims, 2 Drawing Sheets

FUEL TANK BAFFLE

FIELD OF THE INVENTION

The subject of the invention relates to fuel tanks for use in vehicles and, more particularly, to common baffles for fluid flow energy attenuation in fuel tanks.

BACKGROUND

Fuel tanks are utilized to store fuel in vehicles, typically for consumption by an internal combustion engine. Vehicles, being a moveable platform, often require some mechanism to control the movement of fuel within the fuel tanks during operation. Without control of fuel movement, noise may be radiated into the passenger compartment. In addition, at low fuel levels, uncontrolled fuel movement may result in fuel starving at the fuel pump pick-up which may affect engine performance. To reduce fuel movement and noise, baffles are placed inside the fuel tank. The baffles act to control/dissipate the fluid momentum/energy when the vehicle accelerates, decelerates and corners. It is a common practice to design one or more fuel tank baffles exclusively for each fuel tank. Such a practice is both time consuming and costly. It would be desirable to introduce a fuel tank baffle of common design that is applicable across fuel tanks regardless of configuration.

SUMMARY OF THE INVENTION

In an exemplary embodiment a fuel tank assembly comprises a fuel reservoir and a fuel flow control baffle positioned within the fuel reservoir to reduce the fluid energy/momentum of moving fuel. The fuel flow control baffle further comprises a sheet assembly including a first sheet layer and a second sheet layer, perforations defining attenuation channels, extending through said first and second sheet layers through which moving fuel flows into the fuel flow control baffle and a web positioned between the sheet layers to absorb the fluid energy/momentum of the moving fuel and to reverse the fuel flow back through the flow attenuation channels.

In another exemplary embodiment a fuel flow control baffle is positioned within a fuel reservoir to reduce the fluid energy/momentum of moving fuel. The fuel flow control baffle comprises a sheet assembly including a first sheet layer and a second sheet layer, perforations defining attenuation channels, extending through said first and second sheet layers through which moving fuel flows into the fuel flow control baffle and a web positioned between the sheet layers to absorb the fluid energy/momentum of the moving fuel and to reverse the fuel flow back through the flow attenuation channels.

The above features and advantages, and other features and advantages of the invention, are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
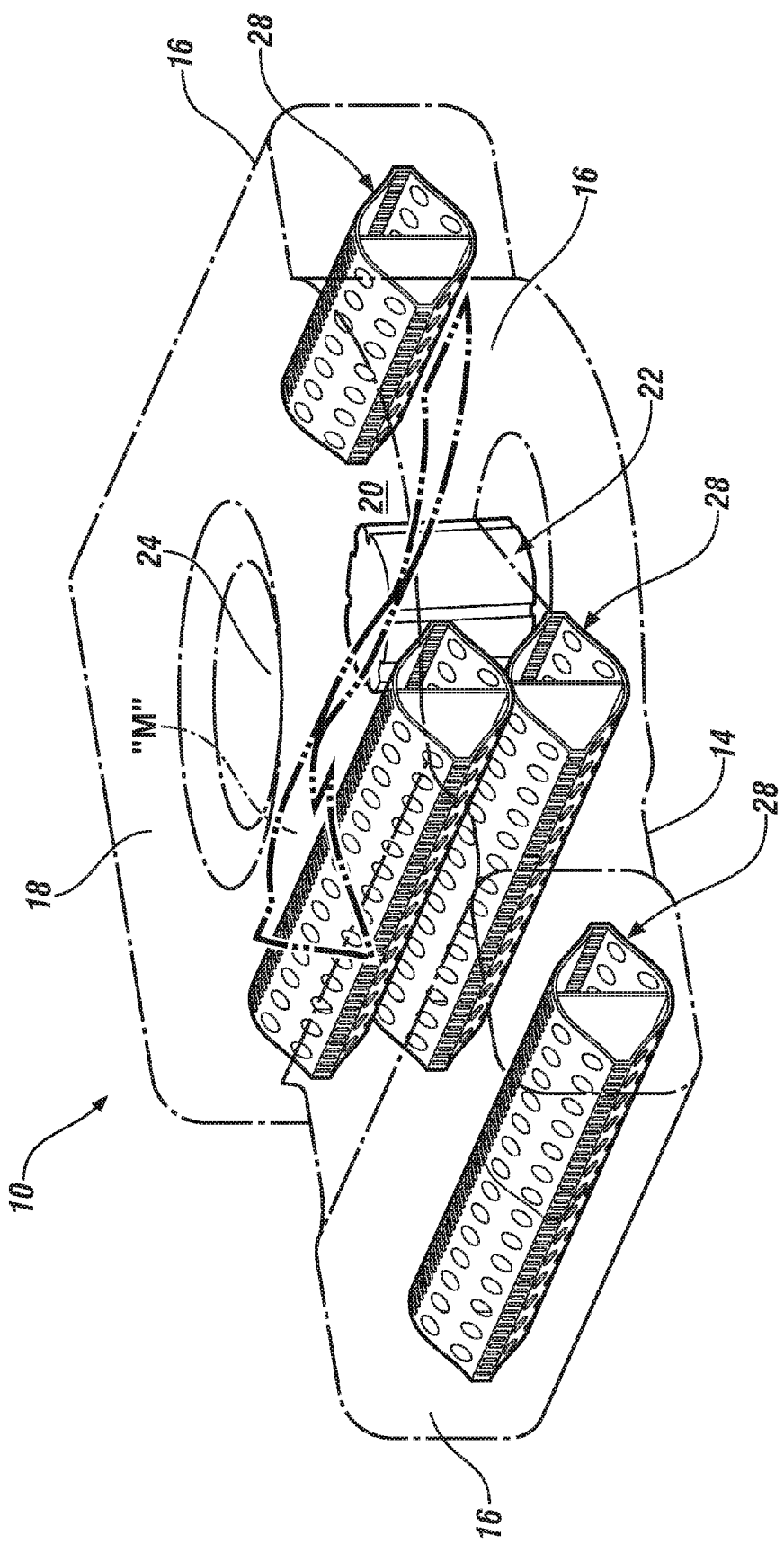
FIG. 1 is a perspective view, in phantom, of a fuel tank assembly embodying features of the invention.

The following description is merely exemplary in nature and is not intended to limit the present disclosure, its application or uses. It should be understood that throughout the drawings, corresponding reference numerals indicate like or corresponding parts and features. As used herein, the term vehicle is not limited to just an automobile, truck, van or sport utility vehicle, but includes any self-propelled or towed conveyance suitable for transporting a liquid burden. The embodiments shown are applicable to vehicle components, but the system disclosed herein may be used in any suitable applications in which fluid is stored in a tank which is subject to movement or other agitation (ex. transportation, energy and aerospace applications, and particularly including many other types of vehicular components and applications).

Referring now to FIG. 1, in an exemplary embodiment, a fluid tank such as fuel tank 10 for use in a motor vehicle is illustrated. The fuel tank assembly 10 may be constructed of metal, polymer or a composite material with a bottom 14, sides 16 and an upper surface or top portion 18 that define a fuel reservoir 20. Disposed in the fuel reservoir 20 is a fuel pump assembly 22. The fuel pump assembly is, in an embodiment, disposed within the fuel reservoir 20 such that a fuel inlet (not shown) is positioned near or adjacent to the bottom 14 in a location that promotes full usage of the fuel supply 24 therein.

A standardized fuel flow control baffle (or baffles) 28 is positioned within the fuel reservoir 20 of the fuel tank 10. The fuel flow control baffle 28 maybe placed singularly or in groups depending upon the particular flow characteristics of the fuel supply 24 within the fuel tank 10 when the motor vehicle 12, or other platform upon which the tank is mounted, is in motion. Each fuel flow control baffle 28, to be described in further detail herein, operates on the fuel supply 24 in the fuel tank 10 to reduce the fluid energy/momentum "M" of the fuel in the vertical, lateral and in the horizontal flow directions. More specifically, the baffles dissipate energy in the moving fuel supply 24 and, thus, noise (ex. slosh) generated by the moving fuel which may be transmitted to the vehicle interior.

Figure 2:
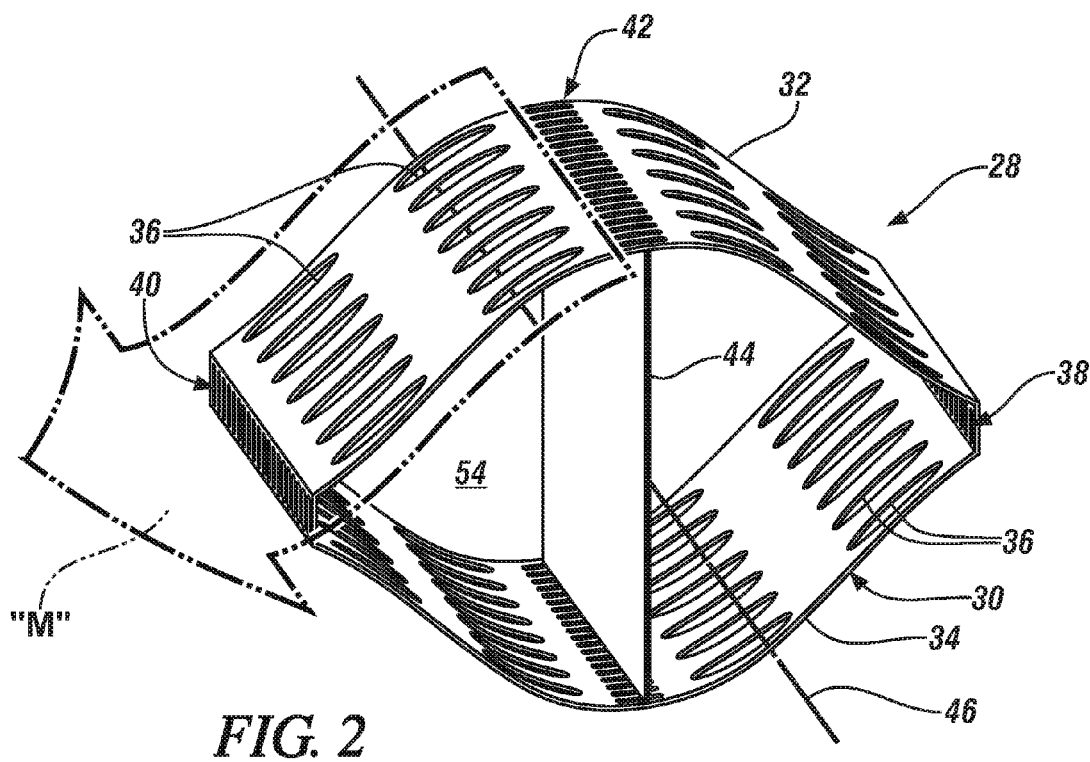
FIG. 2 is a perspective view of a fuel flow control baffle embodying features of the invention.
Figure 3:
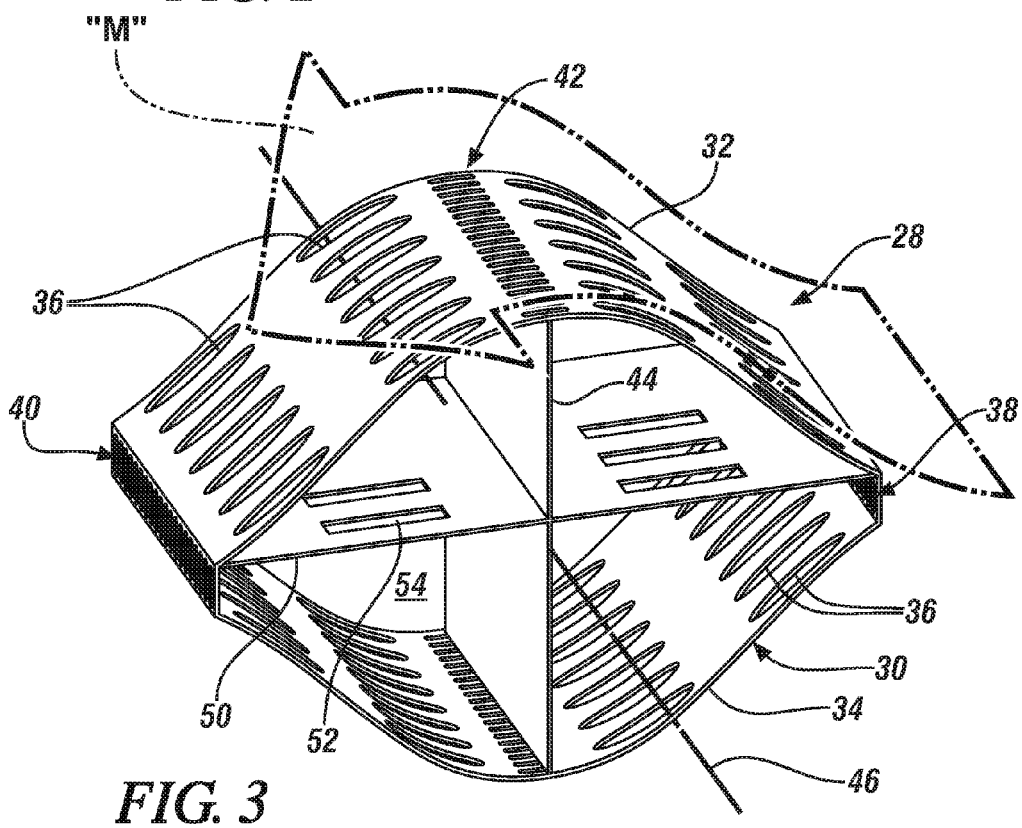
FIG. 3 is a perspective view of another embodiment of the fuel flow control baffle of FIG. 2.

Referring now to FIGS. 2 and 3, with continuing reference to FIG. 1, a standardized fuel flow control baffle 28 may comprise a sheet assembly 30 including a first sheet layer 32 and a second sheet layer 34. The layers are constructed of semi-rigid material such as metal, polymer, fuel resistant composite or other suitable material that exhibits stiffness and durability in the specific fluidic environment of the tank. In an embodiment, the sheet layers 32, 34 may include perforations that operate as attenuation channels 36 extending therethrough. The sheet layers 32 and 34 are fixed together at the ends 38 and 40 of the sheet member by crimping, welding or adhering. In an embodiment, the sheet assembly 30 may be formed through an extrusion or roll-forming process to form and join first and second sheet layers 32 and 34 concurrently, eliminating the need to fix the sheet layers 32 and 34 together at the ends 38 and 40.

The sheet layers 32 and 34 of the sheet assembly 30 are separated at a central location or portion 42 to allow the insertion of a semi-rigid or flexible cross-member or web 44. The web 44 is positioned parallel to the axis 46 of the sheet assembly 30. The web 44 is constructed of rigid or a semi-rigid material such as metal, polymer, fuel resistant composite or other suitable material that exhibits durability in the specific fluidic environment of the tank. In an embodiment, the web 44 is constructed of a highly flexible material such as an elastomer or other suitable material that exhibits high flexibility and structural damping to increase fluid energy/momentum absorption and fluid flow reversal as well as durability in the specific fluidic environment of the tank. Flow channels 52 may open through the web 44. In an embodiment, one or more additional webs 50 may also be positioned to extend between the sheet layers 32 and 34 when additional fuel flow control is desired. The additional webs 50 may also include flow channels 52 opening therethrough.

During operation of the motor vehicle, acceleration, deceleration and cornering (for example) may cause slosh induced noise due to the movement of the fuel supply 24 within the fuel tank 10. The standardized fuel flow control baffles 28 described herein are easily varied in length and cross-sectional dimension, can be easily stacked horizontally and vertically and can be placed near the bottom 14, the sides 16 or the top portion 18 of the fuel tank 10. The outer geometry of the fuel flow control baffles 28 induces an energy reducing effect on the moving fuel supply 24 as it passes over the baffle and the flow attenuation channels 36 enhance the effect by allowing some fuel to enter the inner chamber 54 of the baffle where fluid energy/momentum "M" is further reduced through interaction with the rigid, semi-rigid or flexible webs 44 and additional webs 50. The webs 44, 50 operate to absorb fluid energy/momentum "M" and to reverse the fluid flow back through the flow attenuation channels 36. The standardized fuel control baffles 28 described herein can be easily varied in length to permit usage in multiple locations in the same tank and in other tank assemblies 10 to reduce timing and cost of developing fuel control assemblies for individual fuel tanks.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation of material to the teachings of the invention without departing from the essential scope thereof. Therefore, it is intended that the invention not be limited to the particular embodiments disclosed, but that the invention will include all embodiments falling within the scope of the application.

What is claimed is:

1. A fuel tank assembly comprising:
   a fuel reservoir;
   a fuel flow control baffle positioned within the fuel reservoir to reduce the fluid energy/momentum of moving fuel, the fuel flow control baffle further comprising:
      a sheet assembly including a first sheet layer and a second sheet layer, the first sheet layer separated at a central portion that defines a plurality of elongated openings;
      perforations defining attenuation channels, extending through said first and second sheet layers through which moving fuel flows into the fuel flow control baffle; and
      a web positioned between the sheet layers wherein the web operates to absorb the fluid energy/momentum of the moving fuel and to reverse the fuel flow back through the flow attenuation channels.

2. The fuel tank assembly of claim 1, wherein the first and second sheet layers of the sheet assembly are constructed of semi-rigid material comprising metal, polymer, fuel resistant composite or other suitable material that exhibits stiffness and durability in the specific fluidic environment of the tank.

3. The fuel tank assembly of claim 1, wherein the first and second sheet layers of the sheet assembly are fixed together at ends by crimping, welding or adhering.

4. The fuel tank assembly of claim 1, wherein the sheet assembly may be formed through an extrusion or roll-forming process to form and join the first and second sheet layers concurrently.

5. The fuel tank assembly of claim 1, wherein the web is positioned to extend relatively parallel to an axis of the sheet assembly.

6. The fuel tank assembly of claim 1, further comprising an additional web positioned to extend between the sheet layers and disposed transverse to the web.

7. The fuel tank assembly of claim 6, wherein the additional web includes flow channels opening therethrough.

8. The fuel tank assembly of claim 1, further comprising multiple fuel flow control baffles that are stacked horizontally and vertically.

9. The fuel tank assembly of claim 1, said fuel flow control baffle comprising an outer geometry that induces an energy reducing effect on the moving fuel as it passes over the baffle.

10. A fuel flow control baffle positioned within a fuel reservoir to reduce the fluid energy/momentum of moving fuel, the fuel flow control baffle comprising:
    a sheet assembly including a first sheet layer and a second sheet layer, the first sheet layer and the second sheet layer are fixed together at ends that extend between the first sheet layer and the second sheet layer, the ends each defining a plurality of elongated openings:
    perforations defining attenuation channels, extending through said first and second sheet layers through which moving fuel flows into the fuel flow control baffle; and
    a web positioned between the sheet layers wherein the web operates to absorb the fluid energy/momentum of the moving fuel and to reverse the fuel flow back through the flow attenuation channels.

11. The flow control baffle of claim 10, wherein the first and second sheet layers of the sheet assembly are constructed of semi-rigid material.

12. The flow control baffle of claim 10, wherein the first and second sheet layers of the sheet assembly are fixed together at the ends by crimping, welding or adhering.

13. The flow control baffle of claim 10, wherein the sheet assembly may be formed through an extrusion or roll-forming process to form and join the first and second sheet layers concurrently.

14. The flow control baffle of claim 10, wherein the web is positioned to extend relatively parallel to an axis of the sheet assembly.

15. The flow control baffle of claim 10, further comprising an additional web positioned to extend between the ends of the sheet layers when additional fuel flow control is desired.

16. The flow control baffle of claim 10, further comprising multiple fuel flow control baffles that are stacked horizontally and vertically.

17. The flow control baffle of claim 10, said fuel flow control baffle comprising an outer geometry that induces an energy reducing effect on the moving fuel as it passes over the baffle.

18. The flow control baffle of claim 10, wherein the web is constructed of a material having high flexibility and structural damping characteristics to thereby increase fluid energy/momentum absorption and fluid flow reversal.

19. The flow control baffle of claim 10, wherein the baffle design is applicable to multiple fuel tank geometries.

20. A fluid tank assembly comprising:
a fluid reservoir;
a fluid flow control baffle positioned within the fluid reservoir to reduce the fluid energy/momentum of moving fluid, the fluid flow control baffle further comprising:
   a sheet assembly including a first sheet layer and a second sheet layer, each of the first sheet layer and the second sheet layer having a central portion that includes a first plurality of elongated openings, the first sheet layer and the second sheet layer are fixed together at ends having a second plurality of elongated openings;
   perforations defining attenuation channels, extending through said first and second sheet layers through which moving fluid flows into the fluid flow control baffle; and
   a web positioned between the sheet layers, the web extending between the central portions of the first sheet layer and the second sheet layer, wherein the web operates to absorb the fluid energy/momentum of the moving fluid and to reverse the fluid flow back through the flow attenuation channels.

* * * * *